US005504853A

United States Patent [19]
Schuur et al.

[11] Patent Number: 5,504,853
[45] Date of Patent: Apr. 2, 1996

[54] SYSTEM AND METHOD FOR SELECTING SYMBOLS AND DISPLAYING THEIR GRAPHICS OBJECTS IN A DETAIL WINDOW

[75] Inventors: Adrianus Schuur, Herrenberg; Michael Szardenings, Owen/Teck, all of Germany

[73] Assignee: International Business Machines Corporation, Armonk, N.Y.

[21] Appl. No.: 933,425

[22] Filed: Aug. 21, 1992

[30] Foreign Application Priority Data

Aug. 24, 1991 [DE] Germany ............................ 91114247.9

[51] Int. Cl.$^6$ ...................................................... G06F 3/00
[52] U.S. Cl. ............................ 395/160; 395/157; 395/159
[58] Field of Search ..................................... 395/155–161, 395/121, 133, 147; 345/117–120, 113, 121, 133, 138; 364/191

[56] References Cited

U.S. PATENT DOCUMENTS

| | | | |
|---|---|---|---|
| 4,070,710 | 1/1978 | Sukonick et al. | 345/121 X |
| 4,392,130 | 7/1983 | Lundstrom et al. | 345/133 |
| 4,509,043 | 4/1985 | Mossaides | 345/113 |
| 4,663,616 | 5/1987 | Himelstein | 341/121 |
| 4,688,181 | 8/1987 | Cottrell et al. | 395/155 |
| 4,694,404 | 9/1987 | Meagher | 395/121 |
| 4,712,191 | 12/1987 | Penna | 395/156 |
| 4,723,211 | 2/1988 | Barker et al. | 395/147 |
| 4,742,558 | 5/1988 | Ishibashi et al. | 345/138 X |

(List continued on next page.)

FOREIGN PATENT DOCUMENTS

WO91/10191  7/1991  WIPO ............................. G06F 9/44

OTHER PUBLICATIONS

D. Weller, R. Williams, "Graphic and Relational Data Base Support for Problem Solving", ACM, Sigraph, vol. 10, #2, 1976, pp. 183–189.

R. Hiraga, Y. Lien, "A Relational Object Architecture (ROBA) for Managing User Interface Objects", IBM Research, Tokyo Research Laboratory, RT-0039, Apr. 23, 1990, 5 pages.

Bronson, "Video Display Enhancement", United States Statutory Invention Registration, H997, Nov. 5, 1991, 7 pages.

Smith, "Visual Programming in the Interface Construction Set", IEEE, 1988, pp. 109–120.

Meyrowitz, "The Link to Tomorrow", Unix Review, Feb. 1990, pp. 58–67.

Fiderio, "A Grand Vision", Byte, Oct. 1988, pp. 237–268.

Fullwrite Professional: A User's Guide, Ashton-Tate, 1988, pp. 99–122.

Foss, "Tools for Reading and Brousing Hypertext", Info. Proc. & Mang., 1989, pp. 407–418.

Halasa et al, "NoteCards in a Nutshell", CHI&61, 1987, pp. 45–52.

MacProw Pro User's Guide, Claris Corp., 1991, chpts. 1–3, 7–8.

Primary Examiner—Mark R. Powell
Assistant Examiner—John E. Breene
Attorney, Agent, or Firm—Paul S. Drake

[57] ABSTRACT

A display tool is used to simplify the display of a plurality of graphical objects on a display screen. The tool allows a user to select from an inventory of fragments which are required to build a figure. These figures can have child and grandchild elements associated with them. Each figure also has a symbol associated with it. On the display device, an overview window is produced on which graphic objects are shown in symbol form. An arbitrary subset of symbols in the overview window is selected by the user and produces a detail window showing graphical objects or symbols corresponding to the subset of symbols in more detail. These graphical objects are displayed using either their fragment form or their symbol form based on a threshold value as to eliminate overcrowding of screen space. Child and grandchild figure can be directly observed in the detail window by zooming into the selected figure.

9 Claims, 5 Drawing Sheets

U.S. PATENT DOCUMENTS

| | | | |
|---|---|---|---|
| 4,823,303 | 4/1989 | Terasawa et al. | 395/157 X |
| 4,868,766 | 9/1989 | Oosterholt | 395/160 |
| 4,870,397 | 9/1989 | Soto et al. | 395/133 |
| 4,931,783 | 6/1990 | Atkinson | 395/156 |
| 4,939,635 | 7/1990 | Seki et al. | 364/191 |
| 5,019,961 | 5/1991 | Addesso et al. | 395/161 X |
| 5,041,992 | 8/1991 | Cunningham et al. | 395/155 X |
| 5,065,347 | 11/1991 | Pajak et al. | 395/160 |
| 5,093,907 | 3/1992 | Hwong et al. | 395/161 X |
| 5,122,972 | 6/1992 | Richards et al. | 395/157 |
| 5,151,974 | 9/1992 | Tani et al. | 395/157 X |
| 5,226,117 | 7/1993 | Miklos | 395/157 |
| 5,249,265 | 9/1993 | Liang | 395/160 |
| 5,297,253 | 3/1994 | Meisel | 395/160 |
| 5,301,301 | 4/1994 | Kodosky et al. | 395/159 X |
| 5,341,466 | 8/1994 | Perlin et al. | 395/157 X |

FIG. 1
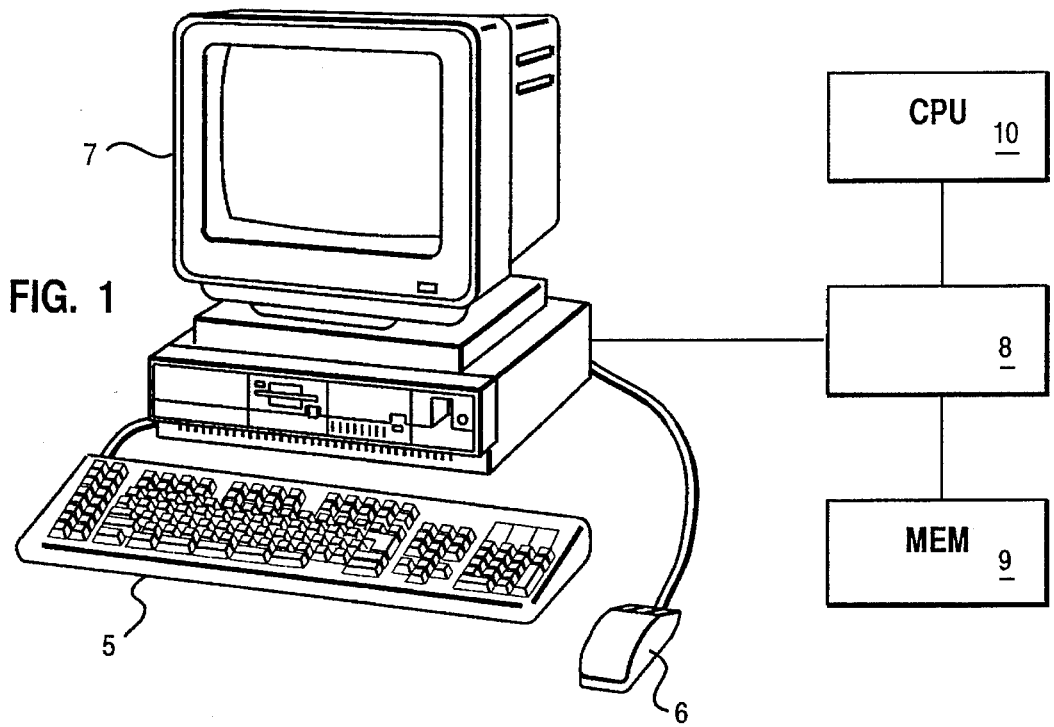
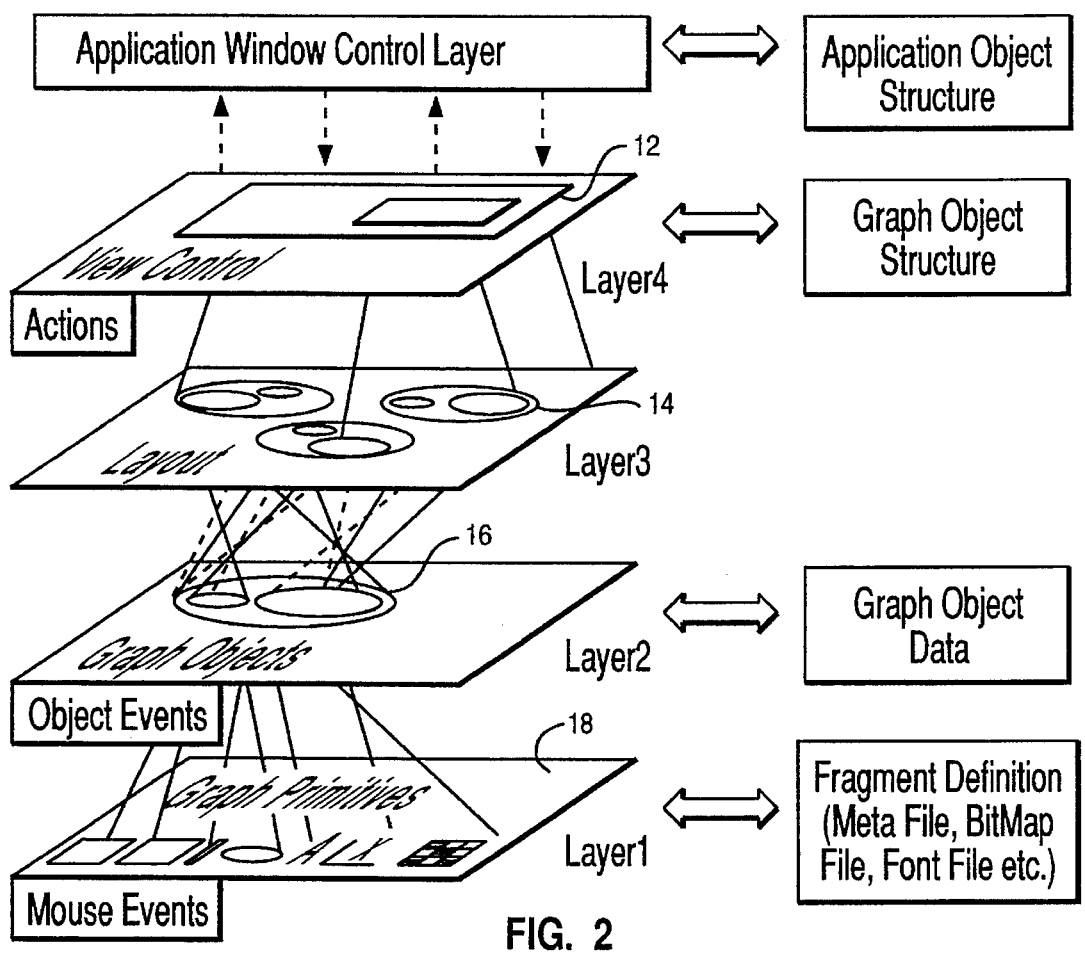
FIG. 2

| INSTANCE |
|---|
| OBJECT TEMPLATE HANDLE |
| LIST OF CONNECTION STYLES |
| LIST OF CHILD OBJECTS |

FIG. 4B

| AREA |
|---|
| LIST OF INSTANCES |
| RELATIVE POSITION |
| USER DATA |
| LAYOUT DATA |
| SIZE OF AREA |
| LIST OF VIEWS |

FIG. 5

| CONNECTION STYLE |
|---|
| HANDLE OF AREA |
| INITIAL DISPLAY |
| CONNECTION TYPE |
| CONNECTION LINE COLOUR |
| CONNECTION LINE TYPE |

FIG. 6A

| INSTANCE OF CONNECTION STYLE |
|---|
| CONNECTION STYLE HANDLE |
| LIST OF GRAPHIC OBJECTS |
| TAG |

FIG. 6B

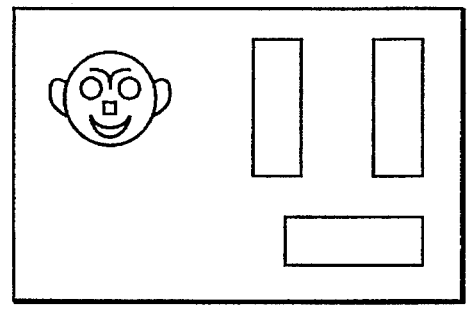
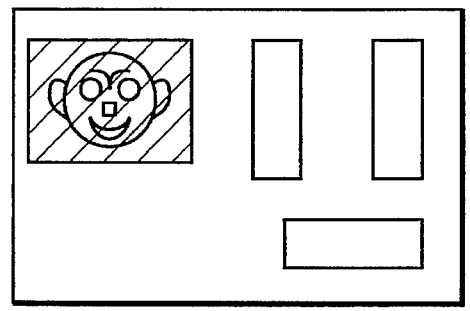

FIG. 7

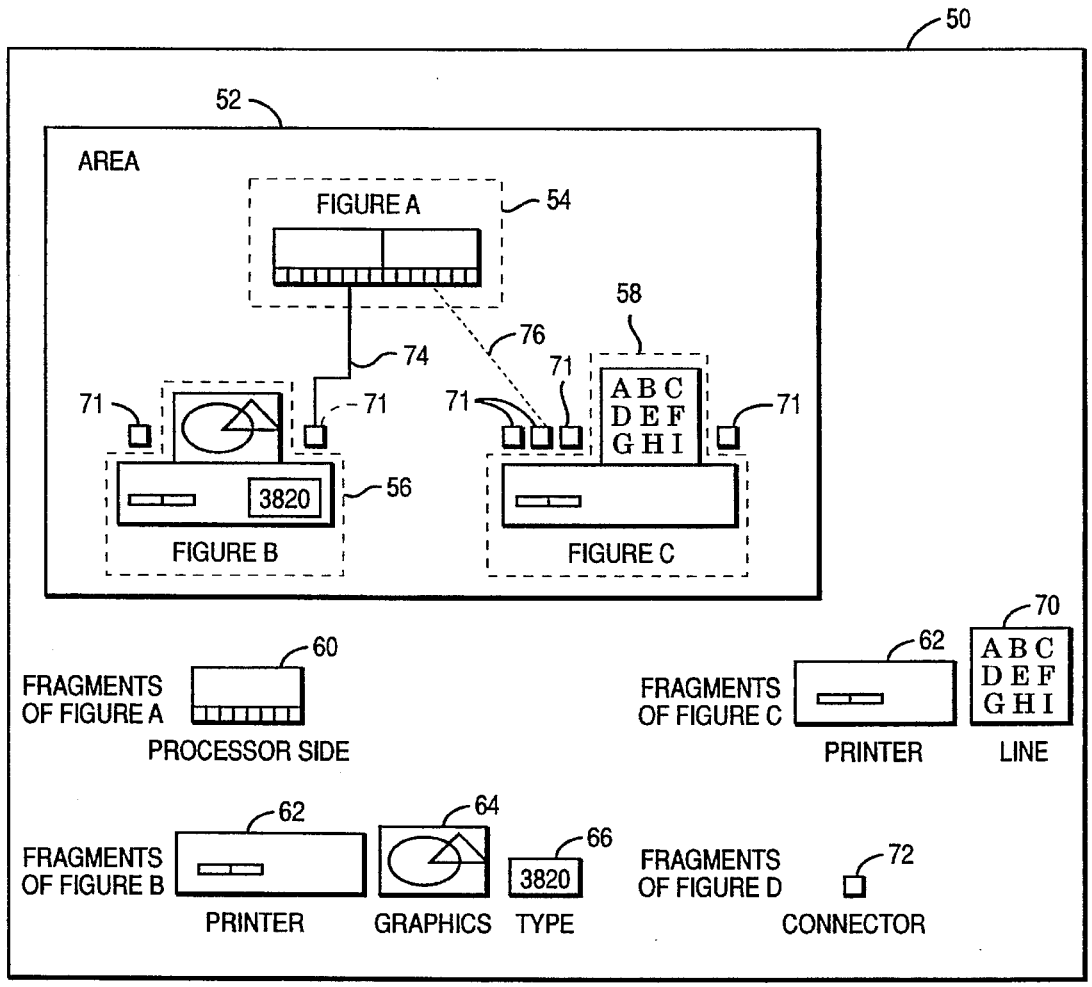

SYSTEM AND METHOD FOR SELECTING SYMBOLS AND DISPLAYING THEIR GRAPHICS OBJECTS IN A DETAIL WINDOW

FIELD OF THE INVENTION

The invention relates to a graphics display tool with a graphics processor for creating images, image memory for storing the images and display means for displaying the images.

BACKGROUND ART

An article in the IBM Technical Disclosure Bulletin, vol 27, no 10A, March 1985, pp 5496, entitled "Display named objects within a document" teaches a real-time multiple data editor which provides for the integration of all data on a single page in a dynamic editable form. The page may contain both text and non-text object sets such as images, graphics, tables, annotations and handwriting. The user may manipulate these object sets on a page. Each object set is assigned a user-specified name and can be recalled at anytime.

The Multiple Icon Viewing Design Tool (MIDVT) is described in an article of the same name in the IBM Technical Disclosure Bulletin, vol 33, no 10B, March 1991, pp 477–478. It is designed to work with the Microsoft Icon Editor and allows users to i) select and simultaneously display a number of icons on a single screen, ii) arrange and move the icon images anywhere within the screen, iii) present the icons with or without their title, iv) change, modify or eliminate their title, v) adjust the background color of the window on which the icon is displayed and vi) expand the size of the icon.

In the article "Homogeneous Presentation Graphics and Bit Image Integration" in the IBM Technical Disclosure Bulletin, vol 31, no 10, March 1989, pp 345–346, a system for integrating graphics objects and bit images is disclosed. This is achieved by defining an empty or null segment in order to reserve a position for the bit image.

European Patent Application EP-A-0 243 228 (PUBLIGRAFA) discloses a system for the creation of images for publicity documents. The system incorporates a video image reader and a graphic console with keyboard, graphic tablet and a monitor to receive, combine and modify image signals and colors. A computer is used to combine the video and vectorial image signals and creates one picture or a series of pictures simulating a product wrapper.

European Patent Application EP-A-0 352 012 (IBM) discloses a system for displaying graphics images on a display device. The system comprises a memory for storing graphics images represented by a plurality of picture elements. The memory is divided into a plurality of memory buffers and the graphics images can be either stored in a plurality of memory buffers or in successive positions in one of the memory buffers. Image mixing means combine the required picture elements for display.

Similarly U.S. patent U.S. Pat. No. 4,392,130 (ASEA) teaches a method for presenting graphical information in the form of an image in which the image is assembled from a plurality of symbols defined in advance.

An automatic icon generation system is described in the European Patent Application EP-A-0 427 264 (FUJITSU). The system comprises an icon pattern memory for memorizing, as icon patterns, a plurality of graphic elements, an icon synthesizer for generating the icon from the icon patterns, an icon utilization controller and a display controller for displaying the icons.

A number of commercial products are on the market which allow a user to create his or her own graphical displays on a display device such as a VDU terminal. Two of the best known are incorporated into the IBM Presentation Manager and the Microsoft Windows. Microsoft Windows provides a Paintbrush facility which enables the user either to produce a graphical display freehand or to combine pre-defined graphical elements, such as a square, circle, rectangle etc. in order to produce a new image. The image can be colored, enlarged or altered using the provided tools. The image can be saved for later use. Full details of the operation of the Paintbrush window are given in Chapter 8, pp 257–313 of the Microsoft Windows User's guide for the Windows Graphical Environment, Version 3.0, published by Microsoft Corporation, 1990.

General reference to object-oriented programming techniques can be found in Bertrand Meyer, "Object-oriented software construction", Prentice-Hall, London, 1988.

All of the above cited prior art has the disadvantage that for every new application that a developer writes, the graphic display has to be developed from first principles. That is to say, the applications developer has to develop new display techniques out of very simple graphic fragments. The display techniques form part of the applications program and are permanently stored with it.

In addition, displaying complicated graphical objects and allowing users to directly manipulate the interface requires substantial extra programming, especially if the graphic objects may be networked together.

As graphic displays become more complicated, it is necessary to display more and more items on the screen. This can lead to performance problems when drawing the screens and also results in a lack of clarity of the display.

SUMMARY OF THE INVENTION

The object of the invention is therefore to provide an improved graphics display tool which overcomes the above problems. The invention achieves this by allowing the user to define a graphical object containing details of the appearance of a graphical figure. The user can then define instances of the graphical object which can be directly manipulated within the application that is being written.

In order to improve the performance of the graphic display, with each instance of the graphical object a simple symbol can be associated. This symbol can be displayed instead of the graphical figure.

The instances of the graphical objects can be linked together. These links may be defined between instances of graphical objects in different hierarchical level—to obtain a tree-type structure—or between graphical objects in the same hierarchical level. On the display device, the links may be made to be visible, such as by connecting a line between two linked objects, or they only be noticeable when the user carries out some action, such as zooming.

BRIEF DESCRIPTION OF THE DRAWINGS

FIG. 1 shows the equipment required for implementing this invention.

FIG. 2 shows graphical layer concept according to this invention.

FIG. 4B shows the data structure for an instance of the graphical object.

FIG. 5 shows the data structure for an area.

FIG. 6A shows the data structure for a template of a connection style.

FIG. 6B shows the data structure for an instance of the connection style.

FIG. 7 shows a mark on a figure.

FIG. 8 shows the data structure of a mark style.

FIG. 9 shows the data structure of a view.

FIG. 10 shows graphic objects displayed in an area with the fragments from which the figures representing the graphic objects are built.

DETAILED DESCRIPTION OF THE PREFERRED EMBODIMENT

Definitions

Figure 3:
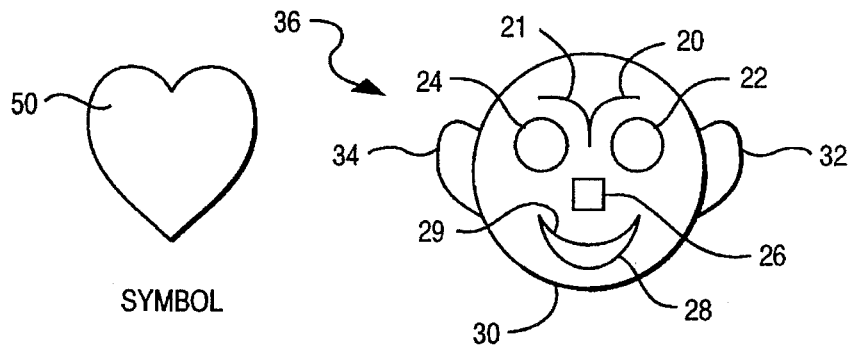
FIG. 3 shows an example of a figure built up from fragments and its associated symbol.

In order to enable a better understanding of the invention, a number of definitions will now be given. Some of these definitions are extracted from the brochure "Operating System/2 Version 1.2 Programming Overview.", first edition, September 1989, published by IBM Corporation. This document is incorporated by reference.

Graphics Presentation Spaces

The graphics presentation space is an area in which graphics pictures are created before being sent to a display device. The graphics presentation space also contains other information about the graphic data it holds. An application must first define one or more graphics presentation spaces. Each presentation space is identified with a unique handle.

Device Contexts

Each display device to which the drawing is to be sent has unique characteristics. Those characteristics are defined in a device context. Each window can have a device context associated with it. Each device context is identified by a device context handle.

Metafiles

A metafile defines the contents of a picture so that it can be used by other applications. Pictures created by an application normally are discarded after the application is run and recreated the next time the application is run. The metafile contains all the instructions required to create the final version of the picture.

Bitmap

A representation in memory of the data displayed on an all-points-addressable (APA) display device, such a a VDU screen. Bit maps define the contents of a complete physical or logical device. A window, for example, is a logical screen. Because bitmaps require no picture generation before displaying their contents on the screen, their greatest advantage is speed.

Icon

A pictorial representation of a selection choice. The icon is defined in a bit map.

Tag

A tag is a line of text. It is most often used for appending text to a picture. They can be surrounded by a box if required.

Geometrics

A list of co-ordinates that are connected by straight lines or splines, thereby forming simple shapes. They can be colored. Specialized geometrics can be used to define chords, boxes etc.

The apparatus required for implementing the invention is shown in FIG. 1. It comprises a display device 7, normally a VDU screen, on which the graphic displays created are to be displayed. Connected to the display screen 7 are a keyboard 5 and a pointing device 6, normally a mouse. A graphics processor 8 creates the graphic display on the screen in accordance with the invention. It defines the graphics presentation space in which the display is to be created and uses the device contexts associated with the display device 7 to produce the display. The graphics processor 8 is connected to another processor 10 on which the application program using the graphic display is running and to memory 9. The memory 9 can comprise both permanent storage, such as a direct access storage device (DASD), and/or temporary storage means, such as random access memory (RAM). The memory 9 can be divided into smaller logical portions, each of which can store all or part of a graphics display together with any other information necessary for the creation of the display, such as the device contexts. Those skilled in the art will be able to design the memory so that it is suitable for the tasks that have to be undertaken. For example, sufficient RAM needs to be provided to store graphics displays or parts thereof required quickly by the graphics processor 8, whilst enough permanent storage needs to be provided so that graphics displays or parts thereof can be stored for use at a later date.

The location of the graphics process 8, processor 10 and memory 9 is immaterial for the implementation of this invention. For example, in one embodiment the graphics processor is incorporated into a workstation together with the display device 7, keyboard 5 and pointing device 6, whilst the processor 10 running the applications program is incorporated into a host computer. The memory 9 is divided between host and workstation.

In another embodiment, no distinction is made between the processor 10 running the applications program and the graphics processor 8. The single processor carrying out both functions is incorporated into a workstation.

The overall graphical display of data in an application running on the processor 10 can be regarded as taking place in different layers as shown in FIG. 2. These layers may be regarded as being part of the interface between the processor (10) running the application and the user. Four layers are shown on this figure. Each layer uses the services provided by the next lower layer.

The highest layer (layer 4) manages views on the display device 7 by means of windows 12 using the layout information 14 on graphic objects found in a third layer 3. The third layer 3 manages the layout of graphic objects in a defined area using the graphic object display information and parameters of a second layer 2. In the second layer 2, the composition of more or less complex graphic objects 16 are built up using the graphic display primitives, also called fragments, 18 of a first layer 1. The first layer 1 is the lowest level and manages the display of graphic display primitives 18 independent of the actual display device 7 used. It provides an inventory of display primitives used in building more complicated figures. The IBM Presentation Manager is one example of a product implementing the first layer 1. It would be installed in the graphics processor 8.

The current application is concerned with the implementation of the second layer 2 of the graphical layer concept described in the previous paragraph. Its principles, however, are not limited to this application and may be more widely applied by those skilled in the art.

The method in which the graphic objects 16 in the second layer 2 are produced will now be described. Before an application can make use of any of the graphic objects, the appearance of the graphic objects has to be created. This process is termed the "registration" of the graphic object and involves the creation of a template for the graphic object which contains details of the information required to produce the graphic object. The template is stored in one of the divisions of the memory 9 and is assigned a handle, which points to its location in the memory 9.

As mentioned above, in order to register the graphic object, the user creates the template for the graphic object. This is done by defining a figure that makes up the graphic object. The figure is constructed from combinations of the fragments or drawing primitives supplied by the first level 1 implementation. The fragments could be, for example, simple geometrical figures such as lines, squares or circles, or they could be geometrics, bitmaps, metafiles or tags. Other types of fragments are possible. An example of a figure 36 created from a number of fragments 20–34 is shown in FIG. 3.

With each created figure 36 a symbol 50 is also created. This symbol is a much simpler representation of the figure and is stored together with the figure as the template for the graphical object in the memory 9. The symbol can be either one of a number of standard symbols supplied in the level 1 implementation or it could be similarly created from fragments.

Having registered the graphic object by creating its template, it is necessary to create an "instance" of the object. This is required since a user running an applications program cannot manipulate the graphic object directly, but can only operate on an instance of it. For example, the applications program may use the same graphic object twice but in different contexts. So the applications program would require two different instances of the same graphic object. The instance is also stored in memory 9 and is pointed to by an instance handle. Using this handle, the graphics processor 8 can call up the instance of the graphic object when required.

The figures can be more complicated than the simple case described above. Figures can be composed of other figures—termed respectively parent figures and child figures. So, for example, in FIG. 3, the fragments 20 and 21 that make up the eyebrows of the face could be defined as a separate child figure, similarly fragments 28 and 29 making up the mouth could be another child figure. Separate templates would be constructed for the graphic object represented by the two child figures. These templates are also stored in memory 9. The instance for the figure 36 would thus comprise not only references to the template of the graphic object making up the parent figure but also to the instance handles of the two child figures. The child figures would thus be linked to the parent figures. The template of the graphic object making up the parent figure would contain references to the fragments 22, 24, 26, 30, 32 and 34 but not to fragments 28 and 29 or 21 and 22.

Of course the child figures might be more complicated than this and, rather than displaying the individual fragments from which the child figure is constructed, the symbol representing the child figure could be displayed together with the fragments making up the parent figure. Whether the symbol or the individual fragments which make up the child figure are to be displayed is discussed later.

Figure 4A:
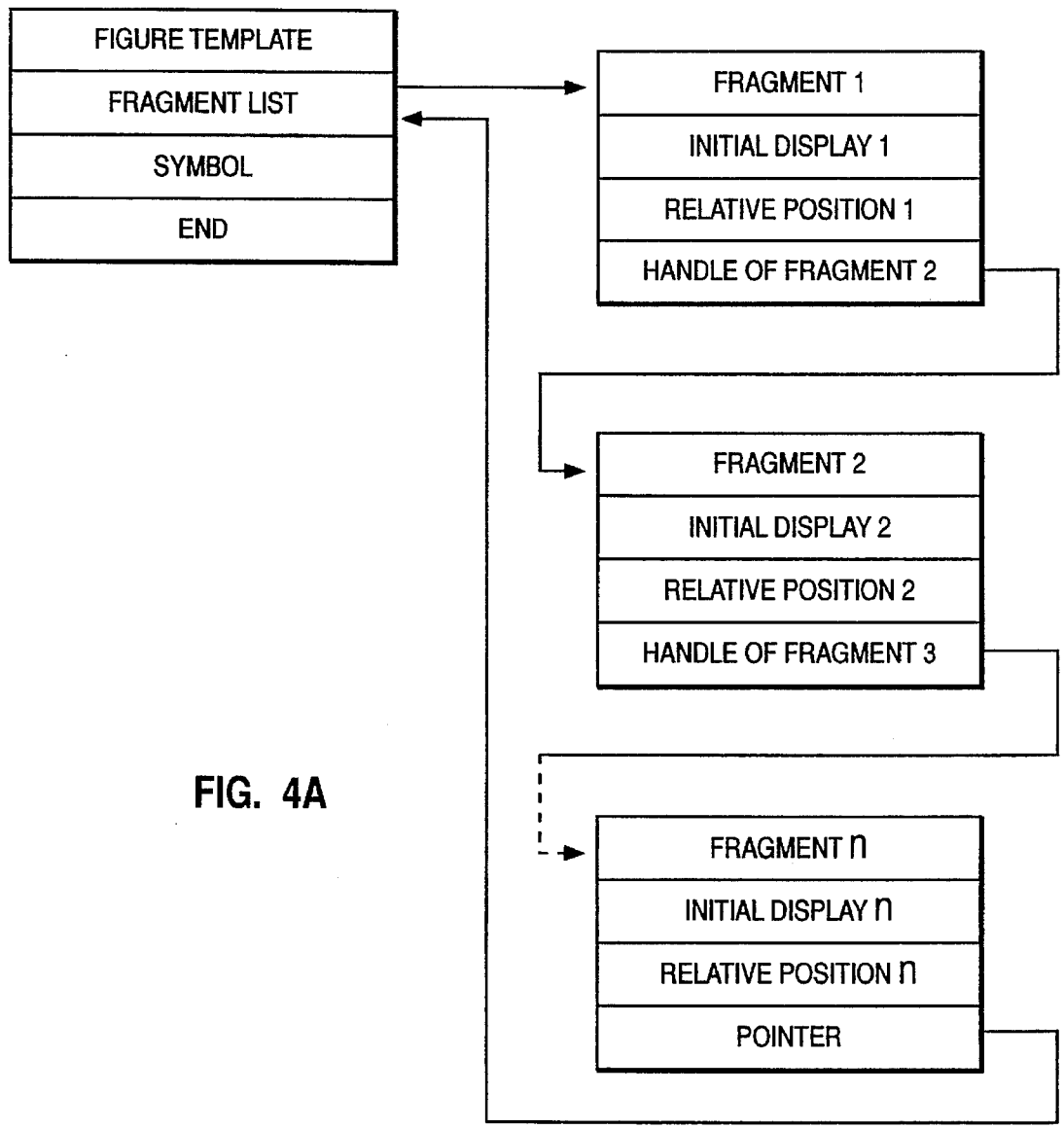
FIG. 4A shows the data structure for a template of a graphical object.

The data structure of the template for the graphic object in the memory 9 is shown on the left hand side of FIG. 4A. It consists of a pointer to the fragment list in which the individual fragments making up the figure are contained and a variable which points to the symbol which represents the figure. The fragment list is shown on the right hand side of FIG. 4A. Each entry in the list is pointed to by the handle of the fragment. The handle identifies the required fragment in the first layer 1 of the graphical display. The next variable in the entry indicates the manner in which the fragment is to be initially displayed, for example switched on or off. How to switch the fragment on or off will be discussed below when the concept of a mark style is introduced. The relative position indicates the co-ordinates of the fragment in the figure. Finally the last variable in the entry is the handle to indicate the position of the next entry of the fragment list in the memory 9. The pointer in the last entry of the fragment list is a special pointer which indicates the end of the list. Fragments can be added or deleted to the graphic object merely by selecting them and adding a new entry into the fragment list. The variable indicating the symbol associated with the graphic object calls a routine which replaces the figure with the symbol. The symbol is, in the preferred embodiment, one of a number of standard symbols provided in the first layer 1 of the graphical display. The symbol could, however, be itself built up from fragments, albeit from a fewer number of them than in the figure.

The data structure of an instance of the graphic object is shown in FIG. 4B. It consists of a handle to the template of the graphic object defined in FIG. 4A and a list of the handles of the connection styles which can be associated with the instance of the graphic object. The term "connection style" is explained in more detail below. In addition with each instance, child objects can be associated. The handles of these associated child objects are given in a list which is also included in the data structure. The data structure of the instance will also contain information regarding the display of the individual fragments should these be altered from their initial values given in the template of the graphic object from which the instance is created.

The child objects are only associated with their parent objects. They have no "existence" of their own. That is to say the child objects can only be displayed on the display device 7 when the parent object is also displayed (the reverse is, however, not true, a parent object can be displayed without its child object). If an instance of the parent object is destroyed, then the instances of the child object are also destroyed. Note however, that destroying the instance of the parent figure will destroy only the instance of the child figure, the template of the child object will not be destroyed. A child object may, in turn, have further "grandchild" objects associated with it, and these in turn can have "great-grandchild" objects and so on. Destruction of the instances in higher levels of object figures in the hierarchy destroys all the instances of the graphic object in lower levels of the hierarchy which are dependent on the destroyed higher level instance.

In addition to creating the instances of the graphic objects, it is necessary to define areas in which the instances of the graphic objects are to be placed. The data structure for the template of an area called an area handle is shown in FIG. 5. It consists of a list of instances of graphic objects that are associated with the area, the relative positions of the instances of the graphic objects in the area, user data and layout data which is input by the application program and a variable indicating the size of the area. Every registered graphic object has to be associated with at least one area in order to be displayed.

Between two figures in the same area, a connection can be established. This connection can be either automatically visible when both figures are displayed, or can be switched on using a pointing device, such as a mouse 6. The data structure for a template for a connection, called a connection style, is shown in FIG. 6A. It comprises the handle for the area in which the connection style is used, variables to indicate the connection type (e.g. straight, curved, dog-legged, etc.), the connection line color (e.g. red, blue, green, etc.) and the connection line type (e.g. points, continuous line, etc.). These options are chosen from the options available in the first layer 1 implementation.

The connection style is used by creating an instance of it in a similar manner to the creation of an instance of a graphic object. The data structure of the instance of the connection style is shown in FIG. 6B. It comprises the handle to the template of the connection style, a list of the handles of the instances of the graphic objects to be connected and a tag which may be attached to the connection to label it.

Two different types of marks can be defined. The first type of mark allows a user to mark a figure with a specific pattern and color. The mark is laid over the figure or displayed as a background to the figure. An example of this is shown in FIG. 7 in which a mark comprising a box with diagonal lines is laid over one of the displayed figures. The second type of mark allows one to declare one or more of the fragments making up the figure to be mark fragments. These fragments can then be either displayed or suppressed, thereby allowing the mark to be visible. The data structure for the template of the mark, called a mark style, is shown in FIG. 8. The handle of the area indicates in which area the mark style is to be displayed. The mark type indicates whether the mark style is of the overlay, background or fragment type. In the first instance, the template will also contain details of the pattern of the mark style and its color. In the second instance, the template will contain a list of the handles of the mark fragments. Those parts of the template not required (i.e. the handles of the mark fragments or the color and pattern of the mark style) are given null values.

In order to display the graphic objects, their positions with respect to each other have to be defined. This is done using a 'view'. A view can be assigned to both areas and graphic objects. The area or graphic object is called the parent of the view. The view is defined as a part of its parent and has a size and position relative to its parent. The size of the view is less than or equal to the size of its parent. For an area, for example, the view would detail the relative positions of all the figures contained in this part of an area. For individual parent figures with child figures, the view would define the relative positions of the child figures with each other and with respect to the parent figure when they are to be displayed together on the display device 7. The data structure for the template of a view is shown in FIG. 9. It consists of the handle of the area or instance of the graphic object with which the view is associated, the relative positions of the graphic objects within an area or child objects within a parent object, handles to the display windows and the size and position of the view. Details of the windows with which instance of the view can be associated are given below.

FIG. 10 shows a display device 50 on which some of these features are illustrated. The area 52 comprises three figures, figure A 54, figure B 56 and figure C 58 which are each labelled. FIG. 10 also shows a further figure, labelled 71, and called figure D, which is repeated six times within the area. Figure A 54 is built up from two fragments 60 combined together, the fragment having the handle 'processor side'. Figure B 56 is built up from fragments 62, 64 and 66 which have the handles 'printer', 'graphics' and 'type' respectively. The figure C is built up from the fragment 62 (also present in figure B) and the fragment 70.

Figure D 71 is built up from the single fragment 72, labelled 'connector', an example of which is shown on the display screen 50 outside the area 52. The figure D 71 clearly shows the difference between a graphic object as incorporated in an area and a fragment. The fragment is supplied by the first level 1 of the graphical display. It cannot, however, be addressed directly until a graphic object has been registered and an instance of the graphic object created.

FIG. 10 also shows two examples of instances of connection styles. Connection style 71 shows a dog-legged continuous line between figure A 54 and one instance of figure D 71. Connection style 76 shows a dotted straight line between figure A 54 and another instance of figure D 71.

The procedures used for creating the code to define the figures, areas, marks and views depend on the type of implementation used for providing the fragments and on the type of display device 7, pointing device and graphics processor 8 supplied. They can be developed using standard compilers and available tools.

Let us now consider the display of the graphic objects on the display device 7. Clearly, as the number of figures displayed changes, then the appearance of a figure on the display screen 7 will have to change. For example displaying a very large number of figures will lead to a complex structure and the 'overview' of the structure may be lost. Problems may also occur when one wishes to operate only on one particular figure, but the display device 7 shows a multitude of figures. This invention therefore provides two types of display techniques: symbol display and fragment display. In the symbol display, the figure is displayed using the symbol defined in the template for the graphic object. When, however, fragment display is specified, then all of the fragments making up the figure are shown. The user can switch between symbol and fragment display, or the graphics processor 8 can automatically select the most appropriate type for display on the display screen 7.

In order to achieve this function, it is necessary to define two types of windows: an overview window and a detail window. Both types of windows are correlated with a view (see above). In an overview window at all times, all of the child figures of a parent figure or all of the figures in an area are displayed in symbol form. That is to say the fragments making up the figure are not displayed, only the symbol associated with the figure is displayed. On the other hand, in a detail window the figures in a view are displayed in either symbol or fragment form. The user can select which of the figures she or he wishes to observe by creating a new view.

Figure 11:
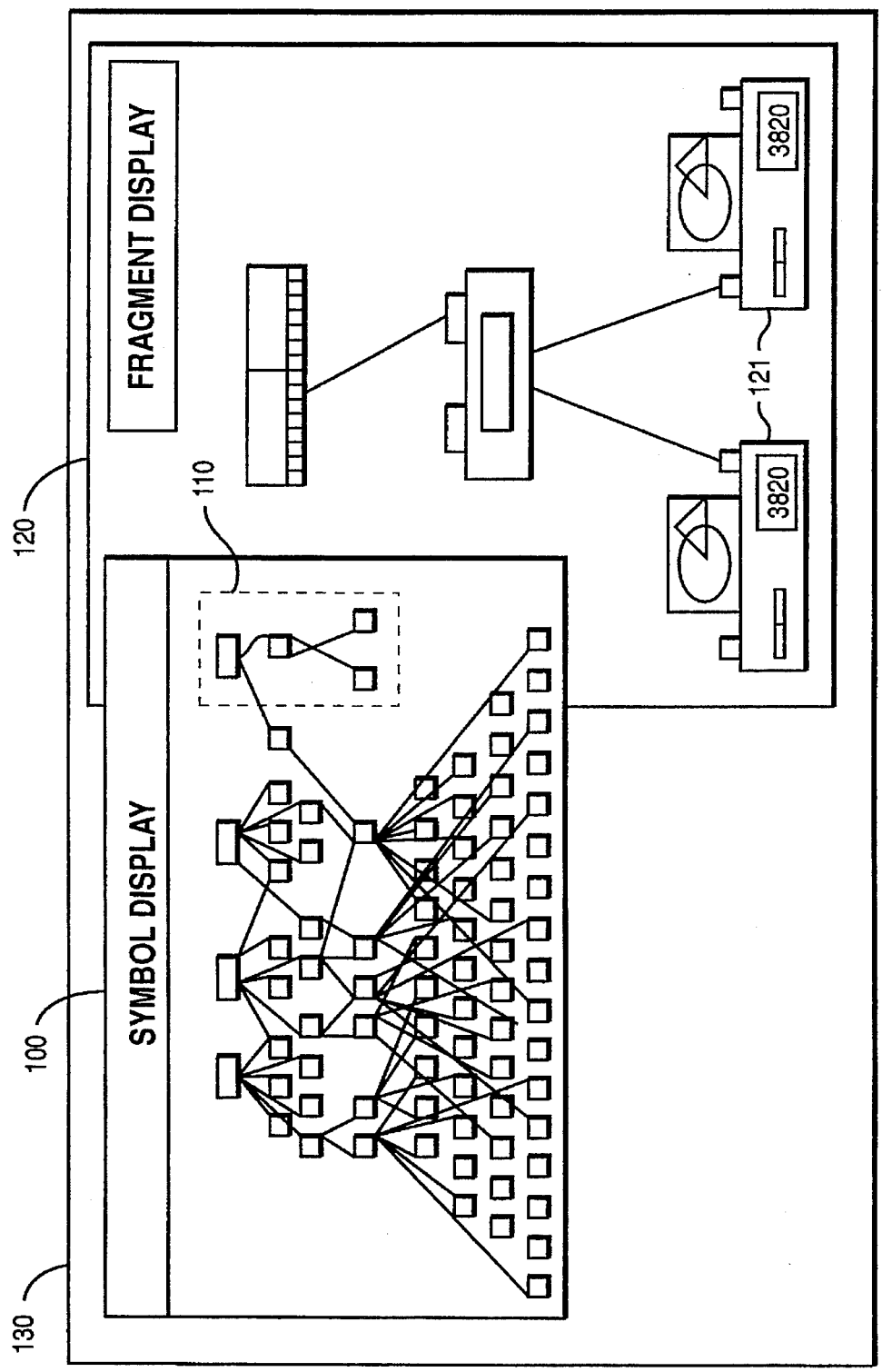
FIG. 11 shows an overview window in symbol display and a detail window in fragment display.

This view is shown on the display device 130 as an outline. An example of this is shown in FIG. 11. On the display device 130, an overview window 100 and a detail window 120 are shown. The figures in the overview window are shown only in symbol form. Part of the figures are outlined 110 and these make up a view. The figures in the view are displayed in fragment form in the detail window 120. The windows containing the views can be moved around the display screen 130 by commands entered on the keyboard 5 or by using the pointing device 6.

In the simplest display form, all of the child figures of a parent figure or all of the figures in an area are displayed in symbol form in the overview window 100 and, within the detail window 120, the figures of the view with which the window 120 is correlated. The user is free to operate on, alter and add new figures using the routines mentioned above.

In a more complicated display, the child figures of a parent figure or all of the figures in an area are similarly displayed in the overview window 100. However, no child figures of child figures are displayed in the overview window. A view is then defined by outlining part of the overview window 100 as shown in FIG. 11. The marking is done using a pointing device 6 or by instructions from a keyboard 5. In the detail window 120, all figures and, if appropriate, the associated child figures 121 contained in the marked outline 110 are displayed. As described above, the invention will select between fragment display and symbol display in the detail window 120 as required. The graphics processor 8 uses a threshold value to determine which type of display to use. This threshold value is changeable by the user. In the preferred embodiment, the automatic selection is carried out by instructing the graphics processor 8 to chose symbol display whenever the number of displayed instance of the graphic objects exceed a certain number.

In order to view another part of the structure, the user may change the size and position of the marked outline 110 using a pointing device, such as the mouse 6, or the keyboard 5. The effect of this is to change the size and position of the view which is then stored in the memory 9. The changed view will be displayed within the detail window 120 as defined above.

Zooming is also possible within the detail window 120. One changes the view by selecting those figures within the detail window 120 which it is desired to observe in greater detail. These selected figures are then presented in the detail window 120. Within the overview window 100, the marked outline 110 is changed to illustrate that portion of the overview contained within the new detail window 120. Changing the size and position of the overview window 100 or zooming and scrolling in the detail window 120 operates on the same instances of the graphic objects, thus changes in either of the windows will lead to corresponding changes in the other window being automatically displayed.

As mentioned previously, some child figures may themselves have child figures (i.e. grandchild figures) attached to them. These may be seen in the detail window 120 but never in the overview window 100. Whether the grandchild figures are observed can be determined by changing a threshold value in the graphics processor 8. In a similar manner to the selection of the symbol display or the fragment display, the invention decides whether a display in the detail window 120 would become too complicated if grandchild figures were being displayed and then switches off the display of grandchild figures.

We claim:

1. A graphics display system comprising:

a graphics processor for generating graphics objects from a plurality of graphics primitives and for generating symbols, each symbol corresponding to at least one of said generated graphics objects;

image memory for storing the generated graphics objects and symbols, the image memory including management means for managing the graphics primitives and graphics objects corresponding to each symbol;

means for a user to select a subset of the symbols displayed in a first window; and display means for displaying the graphics objects and symbols, wherein the symbols corresponding to graphics objects are displayed in the first window and the graphics objects corresponding to the selected subset of the symbols are displayed in a second window with a number of the selected subset of symbols being substituted for corresponding graphics objects according to user input threshold value provided to the management means.

2. The graphics display system of claim 1 wherein the display means displays graphics objects in the second window that correspond to a subset of the symbols displayed in the first window.

3. The graphics display system of claim 2 wherein the user zooms onto selected graphics objects or corresponding symbols in the second window.

4. A data processing system comprising:

a main processor for processing data;

an input device for receiving user input;

a graphics processor, coupled to the main processor, for generating graphics objects from a plurality of graphics primitives and for generating symbols, each symbol corresponding to at least one of said generated graphics objects;

image memory for storing the generated graphics objects and symbols, the image memory including management means for managing the graphics primitives and graphics objects corresponding to each symbol;

means for a user to select a subset of the symbols displayed in a first window; and display means for displaying the graphics objects and symbols, wherein the symbols corresponding to graphics objects are displayed in the first window and the graphics objects corresponding to the selected subset of the symbols are displayed in a second window with a number of the selected subset of symbols being substituted for corresponding graphics objects according to user input threshold value provided to the management means through the input device.

5. The data processing system of claim 4 wherein the display means displays graphics objects in the second window that correspond to a subset of the symbols displayed in the first window.

6. The data processing system of claim 4 wherein the user zooms onto selected graphics objects or corresponding symbols in the second window.

7. A method for displaying graphical information comprising the steps of:

generating graphics objects with a graphics processor from a plurality of graphics primitives and for generating symbols, each symbol corresponding to at least one of said generated graphics objects;

storing in an image memory the generated graphics objects and symbols, the image memory including management means for managing the graphics primitives and graphics objects corresponding to each symbol;

selecting by a user a subset of the symbols displayed in a first window; and displaying on a display means the graphics objects and symbols, wherein the symbols corresponding to graphics objects are displayed in the first window and the graphics objects corresponding to the selected subset of the symbols are displayed in a second window with a number of the selected subset of symbols being substituted for corresponding graphics objects according to user input threshold value provided to the management means.

8. The method of claim 7 wherein the step of displaying includes displaying graphics objects in the second window that correspond to a subset of the symbols displayed in the first window.

9. The method of claim 8 wherein the user zooms onto selected graphics objects or corresponding symbols in the second window.

* * * * *